United States Patent
Fujimoto et al.

(10) Patent No.: US 7,694,605 B2
(45) Date of Patent: Apr. 13, 2010

(54) GEAR CHANGE CONTROL SYSTEM OF AUTOMATIC TRANSMISSION

(75) Inventors: Masashi Fujimoto, Toyoake (JP); Masanori Shintani, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/285,080

(22) Filed: Sep. 29, 2008

(65) Prior Publication Data

US 2009/0205456 A1 Aug. 20, 2009

(30) Foreign Application Priority Data

Feb. 14, 2008 (JP) ............... P.2008-033707

(51) Int. Cl.
*B60K 20/00* (2006.01)
(52) U.S. Cl. ............ 74/473.36; 74/335; 74/473.37
(58) Field of Classification Search ........... 74/473.36, 74/473.37, 340, 339
See application file for complete search history.

(56) References Cited

U.S. PATENT DOCUMENTS 6,634,247 B2 * 10/2003 Pels et al. ............ 74/329

2009/0038423 A1 2/2009 Shintani

FOREIGN PATENT DOCUMENTS

| EP | 0 310 387 A2 | 4/1989 |
| EP | 0418107 A1 | 3/1991 |
| EP | 1308651 A1 | 5/2003 |
| EP | 1510733 A1 * | 3/2005 |
| JP | 6331028 A | 11/1994 |
| JP | 2001-304411 A | 10/2001 |
| JP | 2004-316834 A | 11/2004 |
| JP | 2005-532517 T | 10/2005 |

* cited by examiner

*Primary Examiner*—David D Le
*Assistant Examiner*—Justin Holmes
(74) *Attorney, Agent, or Firm*—Birch, Stewart, Kolasch & Birch, LLP

(57) ABSTRACT

A gear change control system of an automatic transmission, include: a shift member, including a shaft portion which is disposed in such a manner that a selection axis thereof is oriented in a selecting direction and including an arm portion; shift fork portions, operable to make gear shifts of gears; shift rail members, connected to the sift fork portions and arranged in such a manner that shift axes thereof are oriented in a shifting direction; and shift lug members, projecting from the shift rail members and including pillar-shaped portions. The arm portion swings about the selection axis to apply a pressure in the shifting direction from one side of the pillar-shaped portion so as to cause the shift fork portion to perform a shift making operation, and to apply a pressure in the shifting direction from the other side of the pillar-shaped portion so as to cause the shift fork portion to perform a shift withdrawing operation.

6 Claims, 9 Drawing Sheets

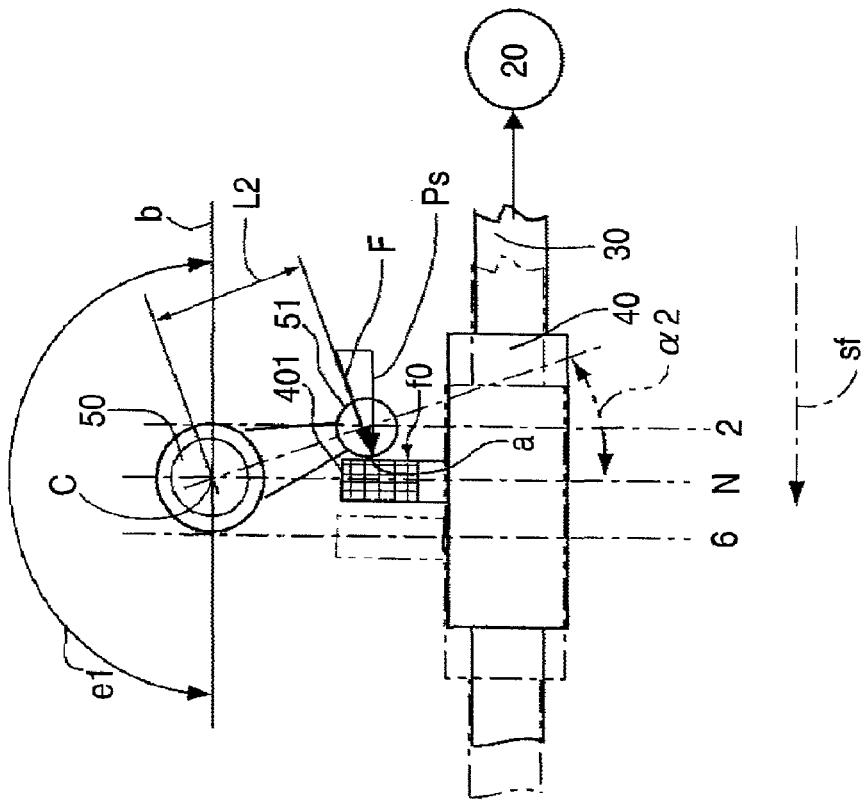
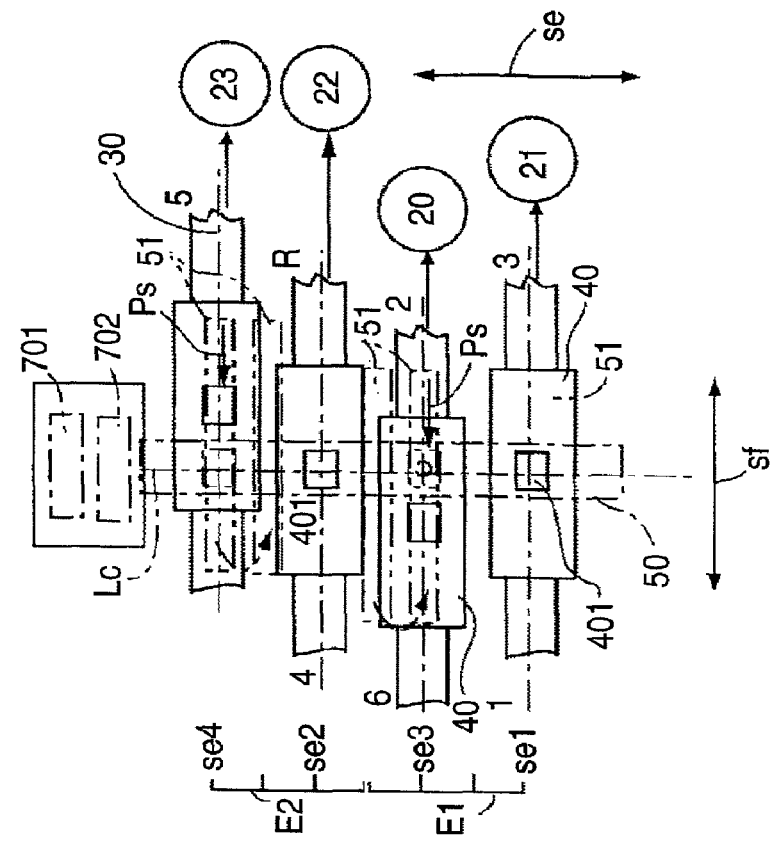

GEAR CHANGE CONTROL SYSTEM OF AUTOMATIC TRANSMISSION

BACKGROUND OF THE INVENTION

1. Field of the Invention

The present invention relates to a gear change control system of an automatic transmission which is provided on a drive train of a vehicle.

2. Description of the Related Art

There is a mechanical automatic transmission which does not use a torque converter as a transmission provided on a drive train of a vehicle.

This mechanical automatic transmission obviates the necessity of a torque converter by implementing the actuation of gear change control (selection and implementation of a gear shift) and engagement and disengagement of a clutch which are to be performed in a manual transmission by an actuator. For example, as is shown in FIGS. 8A and 8B, a gear change control system of an automatic transmission includes a shift shaft 100 which can move in a shifting direction sf and a selecting direction se, shift lugs 120 which are formed, respectively, at one parts on a plurality of shift rails 110 which are arranged in the selecting direction se, in such a manner as to project radially outwards therefrom and shift forks 131, 132, 133 which are connected integrally to another parts of the shift rails 110, respectively.

Furthermore, a control finger (an arm portion) 140 is provided on the shift shaft 100 in such a manner as to project radially therefrom, and a pair of claw portions 121 are formed on each shift lug 120 in such a manner as to be spaced apart from each other in the shifting direction sf.

In the mechanical automatic transmission configured as has been described above, by moving the shift shaft 100 by an actuator (not shown), the pair of claw portions 121 of one of the shift rails 110 are selectively moved in one or the other of the shifting directions sf by the control finger 140, so that the shift fork 131 which is linked with the shift rail 110 is made to shift a gear which faces oppositely the shift fork 131.

Incidentally, a dual-clutch automatic transmission has been developed in which two clutches are incorporated between an automatic transmission like the one described above and an engine which is a power source. This automatic transmission includes first and second main shafts, and one and the other of the main shafts change the speed of a rotational force transmitted thereto from the associated clutches for transmission to countershafts they face oppositely, the speed-changed rotation being then transmitted from each of the countershafts to an output gear side of the transmission. In the dual-clutch automatic transmission, in making a gear shift, a state in which one gear is engaged with one of the clutches via the first main shaft is switched to a state in which a target gear is engaged with the other clutch via the second main shaft, and as this occurs, a neutral state can be eliminated during the gear change by disengaging the one clutch while holding the engagement of the other clutch with the target gear, thereby making it possible to realize a smooth gear change without any interruption of power flow during the gear change.

In a gear change control system adopted in the transmission described above, for example, as is shown in FIG. 9A, it assumes that a gear change has been made from a fourth gear which is a gear currently engaged to a target gear, for example, a first gear while maintaining the state in which the current gear is engaged. Immediately thereafter, as is shown in FIG. 9B, while switching the engaged state of the clutch to the target gear side clutch is in progress, the gear shift made to the previously engaged gear (here, the fourth gear) is withdrawn therefrom. To describe this by reference to a locus indicated by a chain double-dashed line in the figure, in the gear shift withdrawal from the previous gear position, the following steps need to be implemented quickly: firstly, a step (1) in which the control finger is offset from the target gear (the first gear) position in the selecting direction, a shift step (2) in which the control finger returns to a neutral line N, a selecting step (3) in which the control finger moves towards the gear (the fourth gear), a shift step (4) in which the control finger moves towards the gear (the fourth gear), a selecting step (5) in which the control finger reaches the gear (the fourth gear) position, and a gear shift withdrawal step (6) in which the control finger withdraws the gear shift made to the gear (the fourth gear) to a neutral position (indicated by the chain double-dashed line) thereof.

In addition, JP-A-2001-304411 proposes an automatic transmission in which a pair of claw portions are provided on each shift lug in such a manner as to be spaced apart widely from each other in a shifting direction, so that a control finger can enter between the pair of claw portions on the shift lug of a target gear which is in a neutral state only by being moved in a selecting direction from between the pair of claw portions of the shift lug which is in the shifted state, so as to simplify the movement of a shift member.

In this way, in the dual-clutch automatic transmission, since the gear shift to the target gear and the gear shift withdrawal from the currently engaged gear need to be performed in that order during gear change, the movement of the control finger 140 gets complex, resulting in a cause for extending the gear change time, and an improvement in this area has been longed for.

Furthermore, in the related art disclosed in JP-A-2001-304411, in order for the arm portion (the control finger) of the shift member to enter between the pair of claw portions when the arm portion is moved directly in the selecting direction, the pairs of claw portions each have to be disposed in such a manner as to be spaced apart relatively widely from each other. In this case, as is shown in FIG. 7, in the event that an interval L1 between the pair of claw portions 121 is increased, the arm portion 140 of the shift member pushes on the claw portion 121 in such a state that the arm portion 140 is largely inclined in the shifting direction. As this occurs, it assumes that a force acting on the claw portion 121 by a rotational torque T of the control shaft 100 is a tangential force F, a distance from a contact point a between the arm portion 140 of the shift member and the claw portion 121 to an axial center C of the control shaft 100 is a distance L2, and an inclination angle of a line connecting the contact point a with the axial center C towards the shifting direction is an angle α, a component force of the tangential force F in the shifting direction, that is, a component force P1 which constitutes a force for moving the claw portion 121 in the shifting direction is obtained by the following expression (1).

$$P1 = F \times \cos\alpha = (T/L2) \times \cos\alpha \qquad (1)$$

In the expression (1) above, it is found that with the distance L2 being substantially constant irrespective of the angle α, the component force P1 decreases as the angle α increases within a range of 0 to 90 degrees. In addition, it is found that the distance L2 increases and the component force P1 decreases further as the angle α increases within a range of 0 to 90 degrees. Consequently, in the event that the interval L1 between the pair of claw portions 121 is increased as with JP-A-2001-304411, the force P1 which pushes on the claw portion 121 in the shifting direction decreases, and it becomes difficult to move the shift lug which is linked with the claw portion 121 in the sifting direction with good efficiency.

SUMMARY OF THE INVENTION

It is therefore an object of the invention to provide a change-speed shift control system of an automatic transmission which can simplify a shifting process of an arm portion which is made integral with a shift member during gear change so as to increase the change-speed controllability and moreover which can hold relatively large a pressure exerted in a sifting direction by the arm portion so as to shorten a change speed controlling time.

In order to achieve the object, according to the invention, there is provided a gear change control system of an automatic transmission, comprising:

a shift member, including a shaft portion which is disposed in such a manner that a selection axis thereof is oriented in a selecting direction, and including an arm portion which is formed on the shaft portion in such a manner as to project radially therefrom;

shift fork portions, operable to make gear shifts of gears within a change-speed gear section;

a plurality of shift rail members, connected to the sift fork portions, and arranged in such a manner that shift axes thereof are oriented in a shifting direction; and shift lug members, projecting from the shift rail members, and being capable of facing the arm portion, wherein the arm portion of the shift member moves for selection and gear shifting and presses against the selected shift lug member, so that a gear shift to a target gear is attained by the shift fork portion which is linked with the shift lug member so pressed against, the shift lug members include pillar-shaped portions, and the arm portion moves for selection in a direction of the selection axis to select the shift lug member and then swings about the selection axis to apply a pressure in the shifting direction from one side of the pillar-shaped portion of the selected shift lug member so as to cause the shift fork portion of the shift rail member which is linked with the shift lug member to perform a shift making operation, and to apply a pressure in the shifting direction from the other side of the pillar-shaped portion so as to cause the shift fork portion of the shift rail member which is linked with the shift lug member to perform a shift withdrawing operation.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 4A shows a point in time when a first shift operation is made, and FIG. 4B shows a point in time when a shift operation in an opposite direction to the first shift operation is made.

FIG. 5A is a plan view, and FIG. 5B is a side view.

FIGS. 6A and 6B are explanatory diagrams of operations of the arm portion and the projecting portion which are performed when an upshift is made from a fifth gear to a sixth gear by the gear change control system of FIG. 1. FIG. 6A is a plan view, and FIG. 6B is a side view.

FIG. 8A is a plan view, and FIG. 8B is a side view.

FIG. 9A is a plan view, and FIG. 9B is a side view.

DETAILED DESCRIPTION OF THE INVENTION

Hereinafter, a gear change control system of an automatic transmission as an embodiment of the invention will be described by reference to FIGS. 1 and 2.

Figure 1:
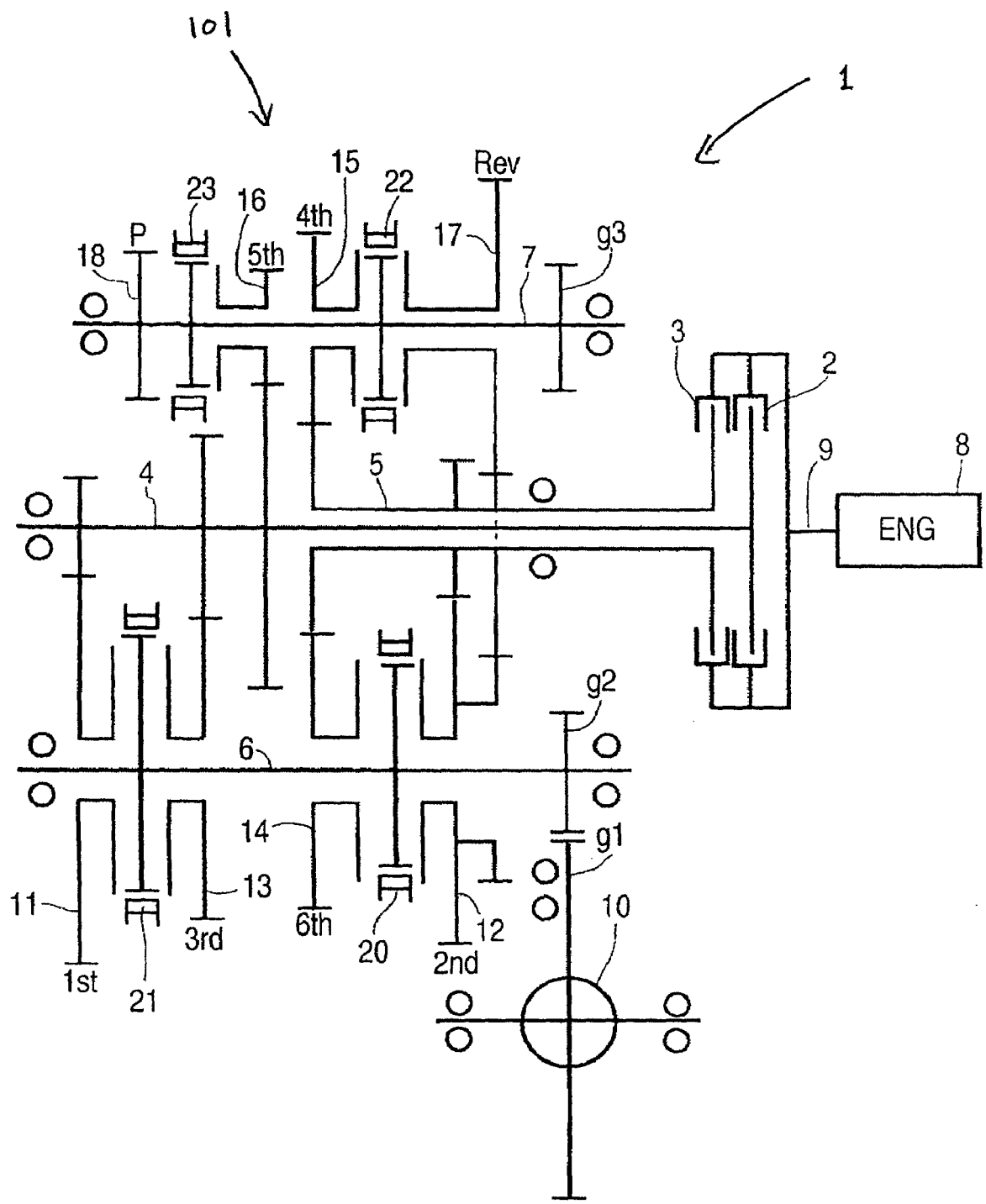
FIG. 1 is a schematic block diagram of a drive train of a vehicle provided with a gear change control system of an automatic transmission as one embodiment of the invention.

As is shown in FIG. 1, an automatic transmission 1 is a dual-clutch automatic transmission and includes two clutches 2, 3, two main shafts 4, 5 which are provided concentrically with each other, and two countershafts 6, 7. Power is transmitted to the first main shaft 4 via the first clutch 2 from a driving force transmission shaft 9 which transmits a driving force from an engine 8, while power is transmitted to the second main shaft 5 via the second clutch 3 from the driving force transmission shaft 9. Note that the two clutches are controlled to be engaged and disengaged by a control circuit (for example, a hydraulic, electric or mechanical control circuit), not shown.

The first countershaft 6 and the second countershaft 7 are disposed in such a manner as to be spaced apart from each other so that their axes become parallel to the first main shaft 4 and the second main shaft 5. In addition, an output gear g2 of the countershaft 6 and an output gear g3 of the countershaft 7 are both made to transmit power to a reduction gear g1 of a differential 10 disposed at a rear stage of the automatic transmission 1.

A first driven gear 11, a second driven gear 12, a third driven gear 13 and a sixth driven gear 14 are supported rotatably on the first counter shaft 6. A fourth driven gear 15, a fifth driven gear 16 and a reverse driven gear 17 are supported rotatably on the countershaft 7. In addition, a parking gear 18 is fixed to the countershaft 7.

Furthermore, the first driven gear 11, the third driven gear 13 and the fifth driven gear 16 which are gears of a first group are coupled to the first main shaft 4 in such a manner that the rotation of the first main shaft 4 can be transmitted to the gears coupled thereto. The second driven gear 12, the fourth driven gear 15, the sixth driven gear 14 and the reverse gear 17 which are gears of a second group are coupled to the second main shaft 5 in such a manner that the rotation of the second main shaft 5 can be transmitted to the gears coupled thereto.

In addition, as is shown in FIG. 1, a transmission section 101 includes four shift forks 20 to 23. The first shift fork 20 and the second shift fork 21 are installed in such a manner as to slide along the axis of the first countershaft 6, while the third shift fork 22 and the fourth shift fork 23 are installed in such a manner as to slide along the axis of the second countershaft 7.

By moving the shift forks 20 to 23 to slide in the way described above, the second driven gear 12 and the sixth driven gear 14 can selectively be connected to or disconnected from (shifted to or from) the countershaft 6 by the first shift fork 20, while the first driven gear 11 and the third driven gear 13 can selectively be connected to or disconnected from (shifted to or from) the countershaft 6 by the second shift fork 21. In addition, the fourth driven gear 15 and the reverse gear 17 can selectively be connected to or disconnected from (shifted to or from) the countershaft 7 by the third shift fork 22, while the fifth driven gear 16 can selectively be connected to or disconnected from (shifted to or from) the countershaft 7 by the fourth shift fork 23.

In this way, in the transmission section 101 of the dual-clutch automatic transmission, a selective switching to any gear of a first group which is made up of a first gear, a third gear and a fifth gear is made to be implemented via the first clutch 2, while a selective switching to any gear of a second group which is made up of a second gear, a fourth gear, a sixth gear and a reverse gear is made to be implemented via the second clutch 3.

Figure 2:
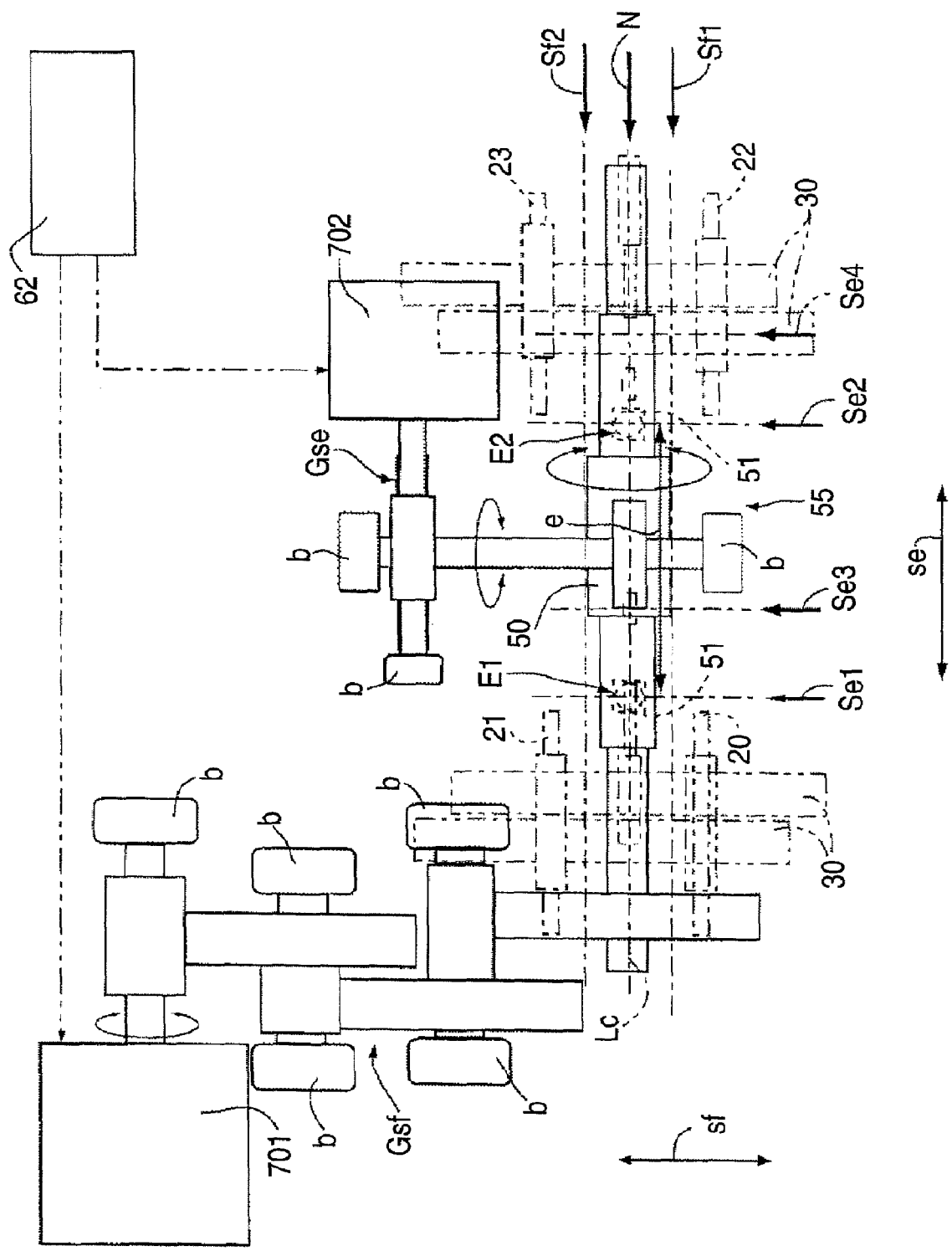
FIG. 2 is a schematic block diagram, as viewed from the top, of the gear change control system of FIG. 1.
Figure 3:
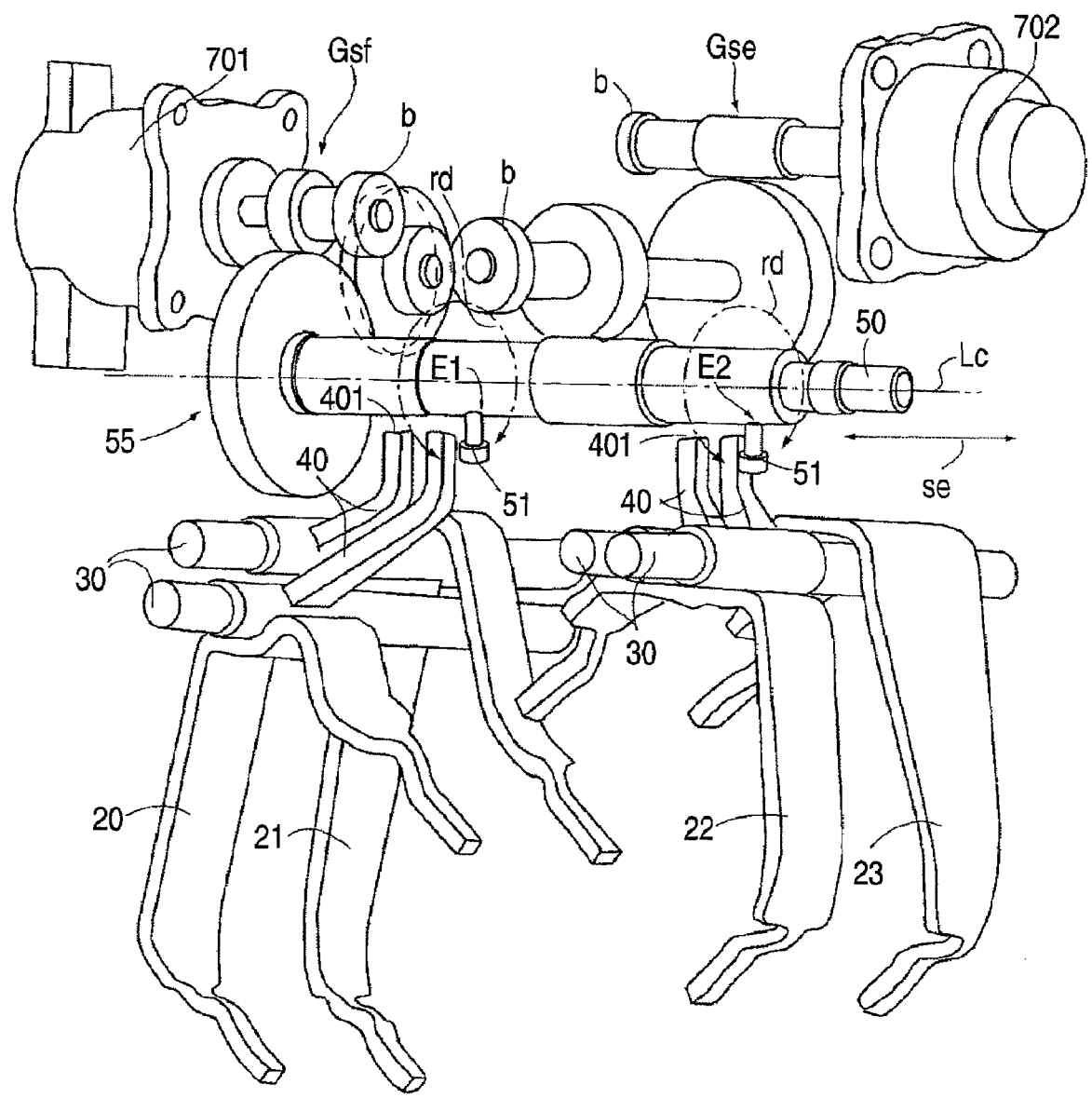
FIG. 3 is a schematic perspective view of a part of the gear change control system of FIG. 1.

As is shown in FIGS. 2 and 3, the gear change control system of the automatic transmission configured as described above includes a shift member 55 having a shaft portion 50 extended in a selecting direction se and an actuator provided at a portion thereof, arm portions (fingers) 51 which are made to project radially from a first position E1 and a second position E2 on the shaft portion 50, a plurality of shift rails 30 which are disposed, as shown in FIGS. 2, 3, 4A and 4B, in such a manner that their axes are oriented in a shifting direction sf which intersects the shaft portion 50 at right angles, shift forks 20 to 23 connected, respectively, to the shift rails 30 and adapted to operate to shift driven gears 11, 12, 13, 14, 15, 16, 17 disposed within the automatic transmission and shift lugs 40 connected, respectively, to the plurality of shift rails 30, made to face oppositely the arm portions 51 and each having a single claw-like projecting portion (a pillar-shaped portion) 401 provided thereon in such a manner as to project therefrom.

In this gear change control system of the automatic transmission 1, a gear shift to a target gear is made by any of the shift forks 20 to 23 which is linked with the shift lug 40 which is selected by the arm portions in the first position E1 and the second position E2 on the shift member 55 being activated by the actuator to move for selection and gear shifting.

As is shown in FIGS. 2, 3, the shift forks 20 to 23 are fixed, respectively, to the four shift rails 30 which are disposed movably in the shifting direction sf. Furthermore, the shift lugs 40 are provided, respectively, on the shift rails 30. The projecting portion (the pillar-shaped portion) 401 is formed on each of the shift lugs 40 in such a manner as to project from the associated shift rail 30 substantially perpendicularly relative to the shifting direction sf, as is shown in FIG. 4B.

Figure 4A:
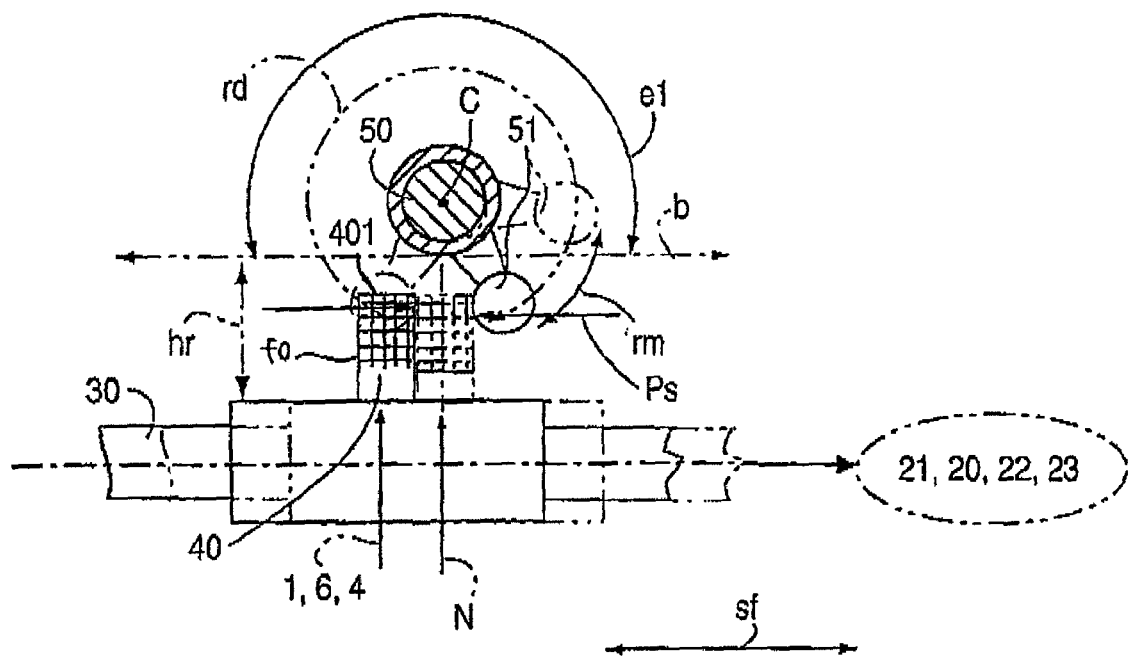
FIGS. 4A and 4B are explanatory diagrams of operations of an arm portion of a shift member and a projecting portion of a shift rail which are used in the gear change control system of FIG. 1.
Figure 4B:
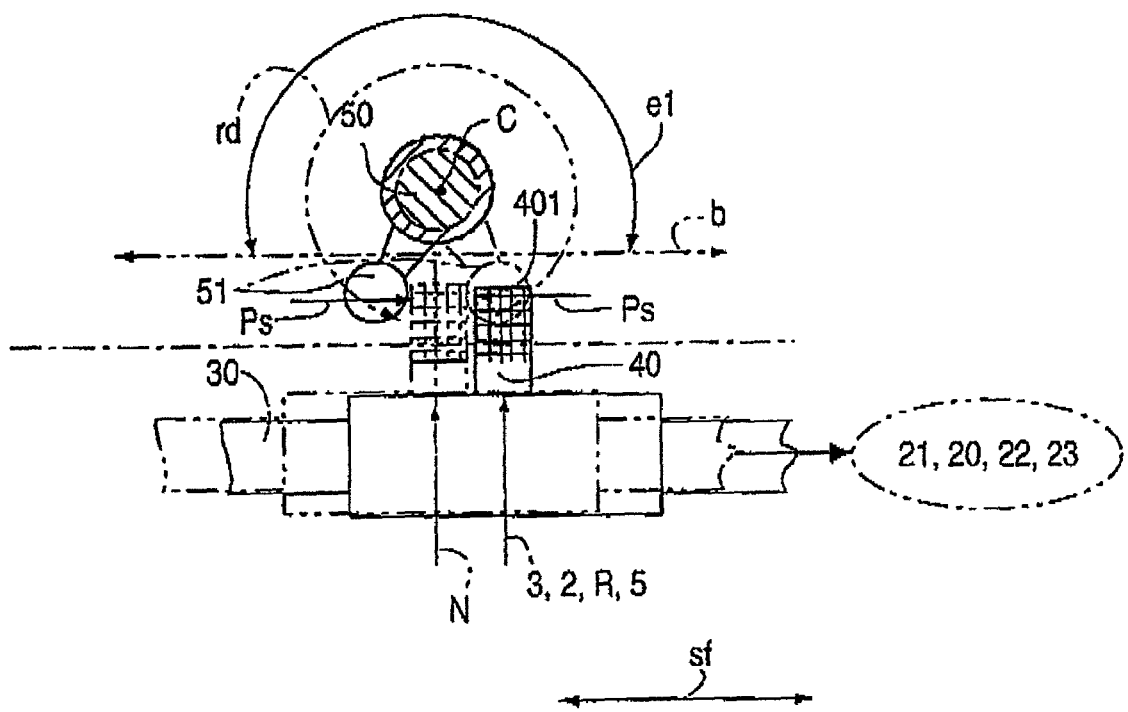

As is shown in FIGS. 4A and 4B, the projecting portion 401 of the shift lug 40 has a pair of side face portions f0 which are oriented oppositely to each other in the shifting direction sf. When a pressure is applied from one of the side surface portions by the arm portion 51, the shift forks 20 to 23 are made to be activated to perform a gear shift making operation, while when the pressure is applied to the other side surface portion, the shift forks 20 to 23 are made to be activated to perform a gear shift withdrawal operation.

By being moved to integrally slide along an operation axis Lc (dented by reference character c in FIGS. 4A and 4B in a selecting direction se (in FIGS. 4A and 4B, a perpendicular direction to the surface of a sheet of paper where the figures are drawn) by the actuator, the arm portions 51 in the first position E1 and the second position E2 can move among the four shift rails 30 and moreover can swing in the shifting direction sf when rotating about the operation axis Lc.

Furthermore, as is shown in FIG. 4A, the arm portion 51 can come into abutment with one of the oppositely facing side surfaces (side walls) of the projecting portion 401 which the arm portion 51 faces oppositely after rotation, that is, the selected projecting portion 401 to apply a pressure Ps thereto, so as to shift the shift rail 30 to be located in one of shift positions. On the other hand, as is shown in FIG. 4B, the arm portion 51 can come into abutment with the other of the oppositely facing side surfaces (side walls) of the projecting portion 401 which the arm portion 51 faces oppositely after rotation to apply the pressure Ps thereto, so as to shift the shift rail 30 to be located in the other shift positions.

Furthermore, as is shown in FIGS. 2, 3, the arm portions 51 are provided on the shaft portion 50 in the first position E1 and the second position E2 in such a manner as to be spaced apart from each other at a predetermined interval e. The arm portion 51 in the first position E1 is made to shift the respective gears (first, second, third and sixth gears) of a first side (a lower side in FIG. 1) group, and the arm portion 51 in the second position E2 is made to shift the respective gears (fourth, fifth and reverse gears) of a second side (an upper side in FIG. 1) group. By this configuration, as is shown in FIG. 2, the arm portion 51 in the first position E1 faces oppositely selecting positions Se1, Se3 of four selecting positions Se1 to Se4, and the arm portion 51 in the second position E2 faces oppositely selecting positions Se2, Se4, whereby a quick selecting operation can be implemented.

In this way, although the arm portions 51 in the first and second positions E1, E2 are spaced apart from each other at the predetermined interval e, the arm portions 51 can be made not to travel over the predetermined interval e. Namely, since the arm portion 51 in the first position E1 is made to shift the respective gears of the first side (the lower side in FIG. 1) group while the arm portion 51 in the second position E2 is made to shift the respective gears of the second side (the upper side in FIG. 1) group, each arm portion 51 can be made not to travel for selection over the predetermined interval e to the group of gears which are to be shifted by the other arm portion 51, whereby a traveling distance in the selecting direction over which the shaft portion 50 has to travel for selection can be made relatively small, thereby making it possible to improve the controllability of the system activated for selection.

Furthermore, when moving in the selecting direction se with respect to the four shift rails 30, the arm portion 51 can move without interfering with the respective projecting portions 401 of the shift lugs 40. Namely, as is shown in FIGS. 4A and 4B, the arm portion 50 is temporarily held in a withdrawal rotation area e1 where a withdrawal position can be secured which is spaced apart further upwards than each shift lug 40 (for example, further upwards than a line denoted by reference character b) by a predetermined distance hr and is then allowed to move freely in the selecting direction se.

Incidentally, as is shown in FIGS. 2, 3, the shift shaft 50 is driven to rotate about the operation axis Lc in the shifting direction by a shifting motor 701 and a reduction gear mechanism Gsf which is linked with the motor 701 and moreover is driven to slide in the operation axis Lc direction by a selecting motor 702 and a reduction gear mechanism Gse which is linked with the motor 702. These shifting motor 701 and selecting motor 702 make up the actuator and these actuator's constituent elements or actuators are controlled to be driven by an ECU 62 based on the operation of a gear shift lever, not shown, and the running conditions of the engine 8. For example, these actuators are switched on and off sequentially when making a gear change from the currently engaged gear to a target gear.

The ECU 62 controls the operation of the clutches 2, 3 when making a gear change. Specifically, when changing gears, the ECU 62 switches a state in which one of the clutches 2 or 3 is engaged with the current gear to a state in which the other clutch 3 or 2 is engaged with the next gear while holding the current gear engaged with the one of the clutches 2 or 3. Then, the previous gear is disengaged at a point in time when the rotational speed of the next gear becomes synchronized with that of the engine, whereby a gear change without any interruption of power flow can be realize.

Next, referring to FIGS. 5A and 5B, a case will be described in which an upshift is made from the currently engaged first gear (lying on the first clutch 2 side) to the second gear (lying on the second clutch 3 side).

Figure 5B:
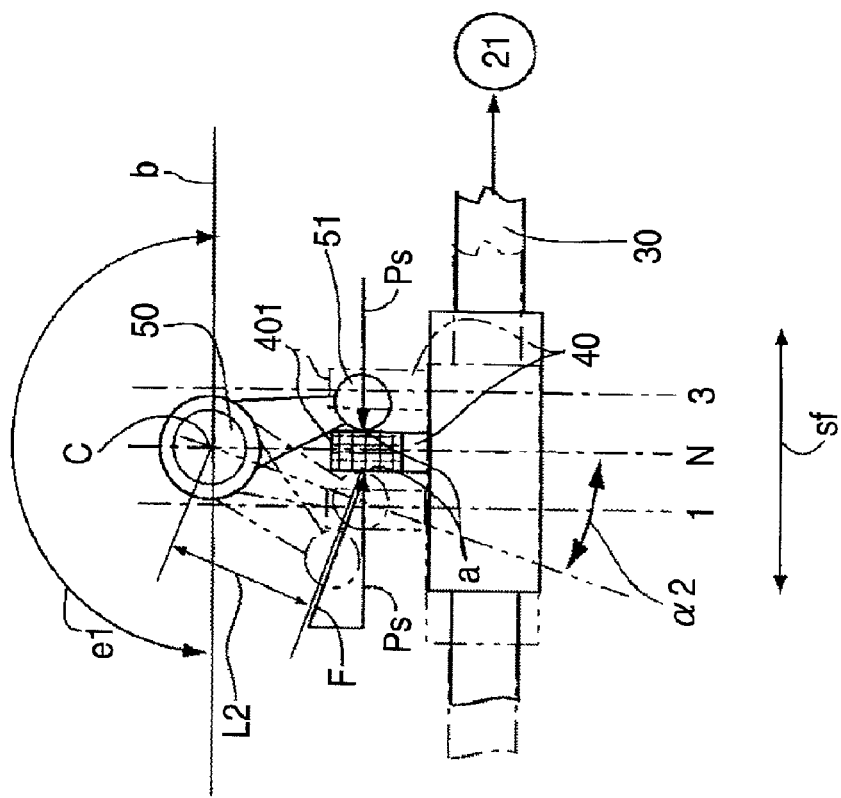
FIGS. 5A and 5B are explanatory diagrams of operations of the arm portion and the projecting portion which are performed when an upshift is made from a first gear to a second gear by the gear change control system of FIG. 1.
Figure 5A:
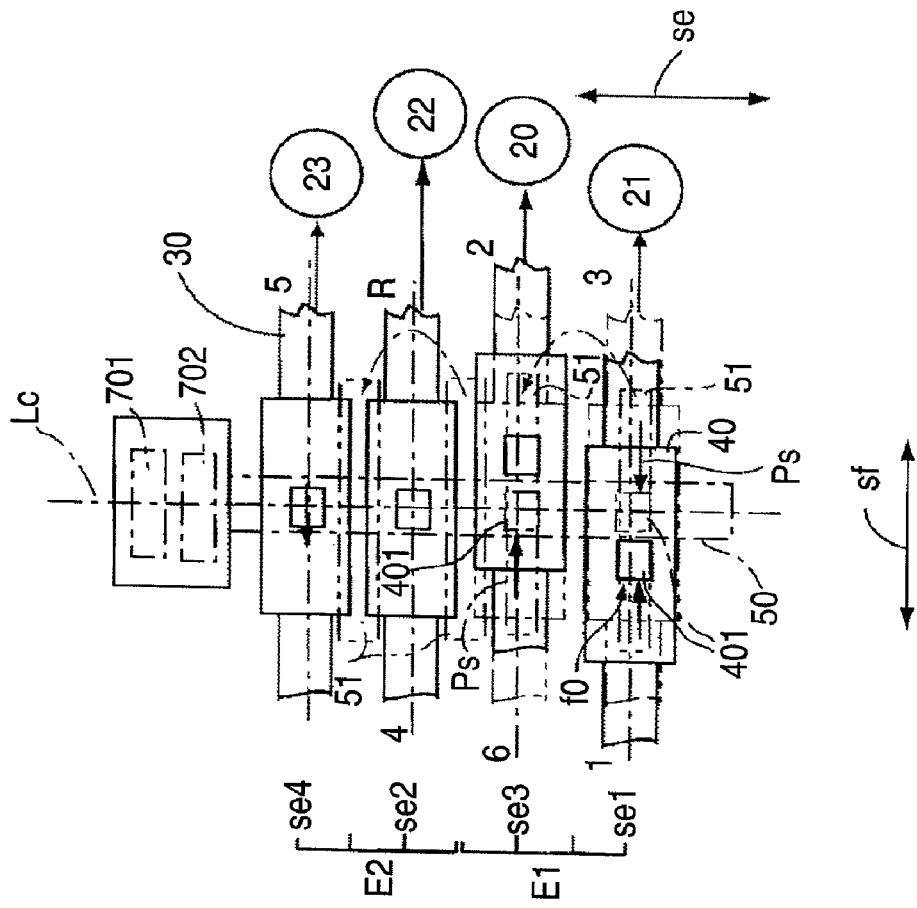
Figure 7:
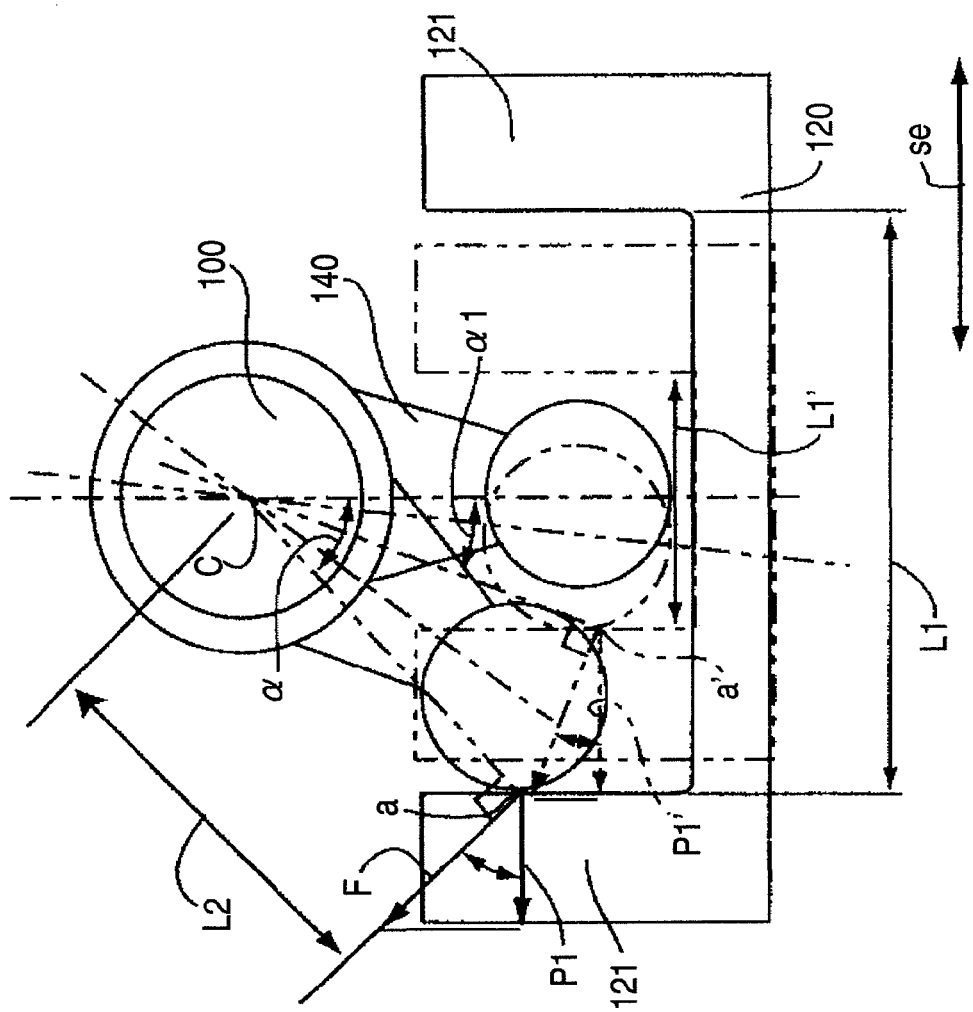
FIG. 7 is an explanatory diagram of operations of an arm portion and a projecting portion which are performed when a gear shift is made by a related-art gear change control system.
Figure 8A:
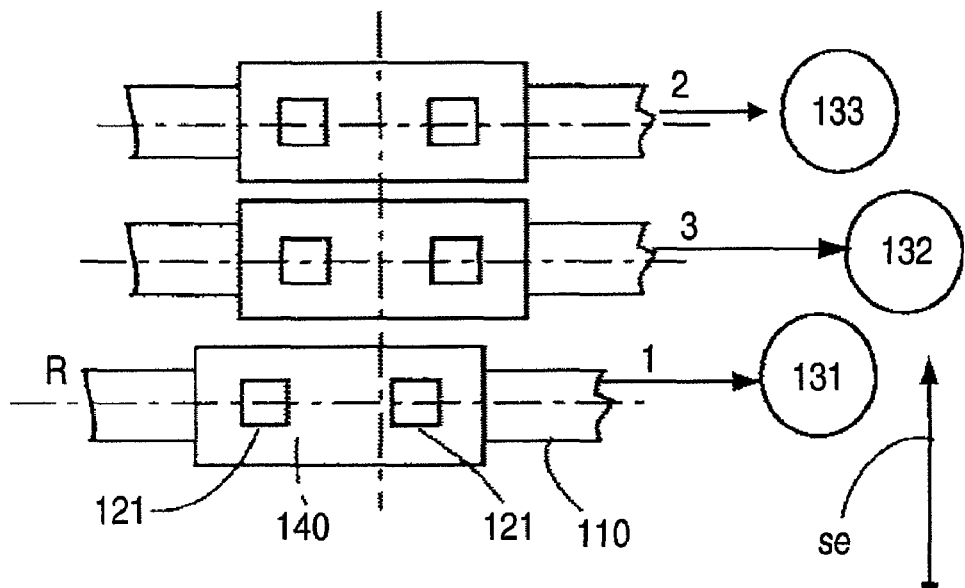
FIGS. 8A and 8B are diagrams showing the arm portion and the projecting portion of a related-art gear change control system.
Figure 8B:
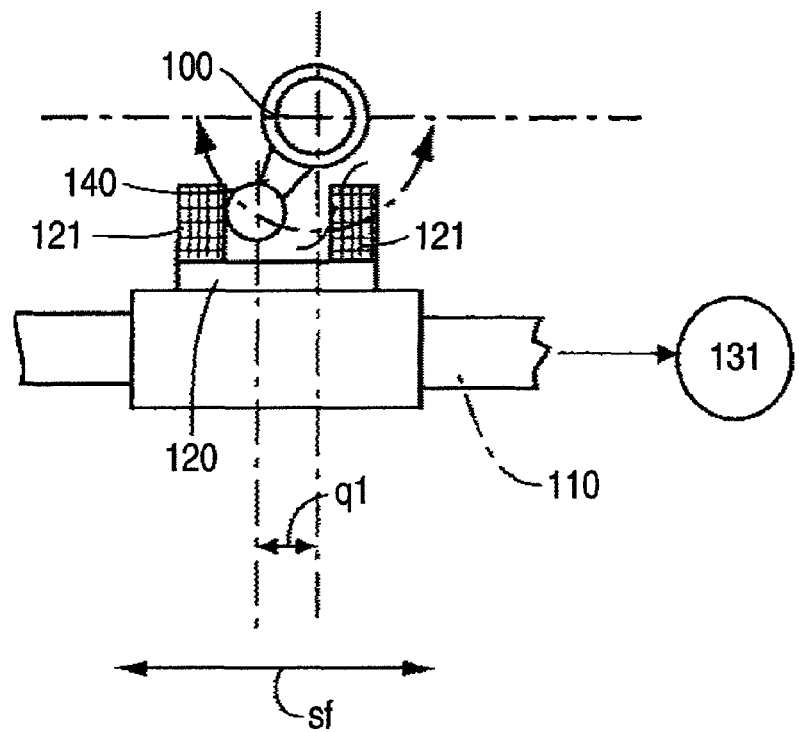
Figure 9A:
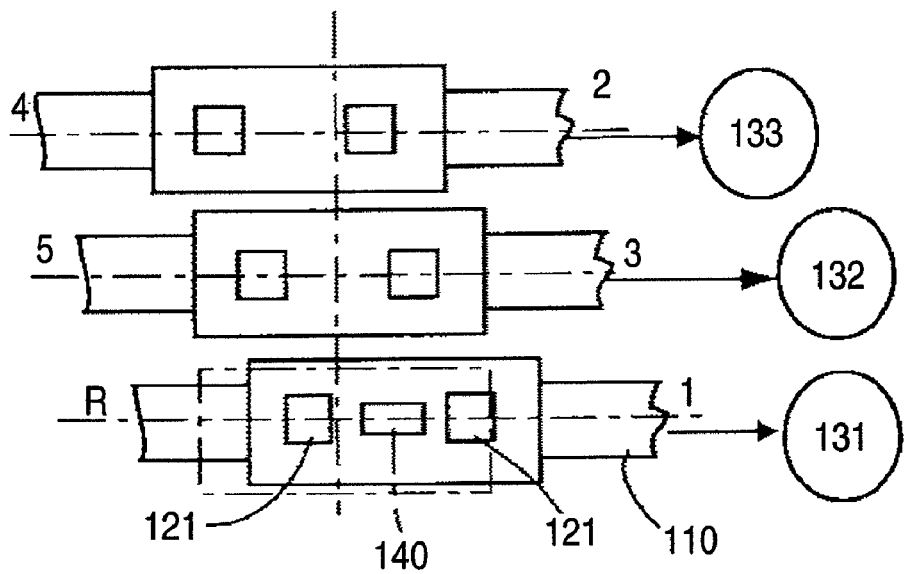
FIGS. 9A and 9B are diagrams showing the arm portion and the projecting portion when a gear shift is made from a fourth gear to a first gear by a related-art gear change control system.
Figure 9B:
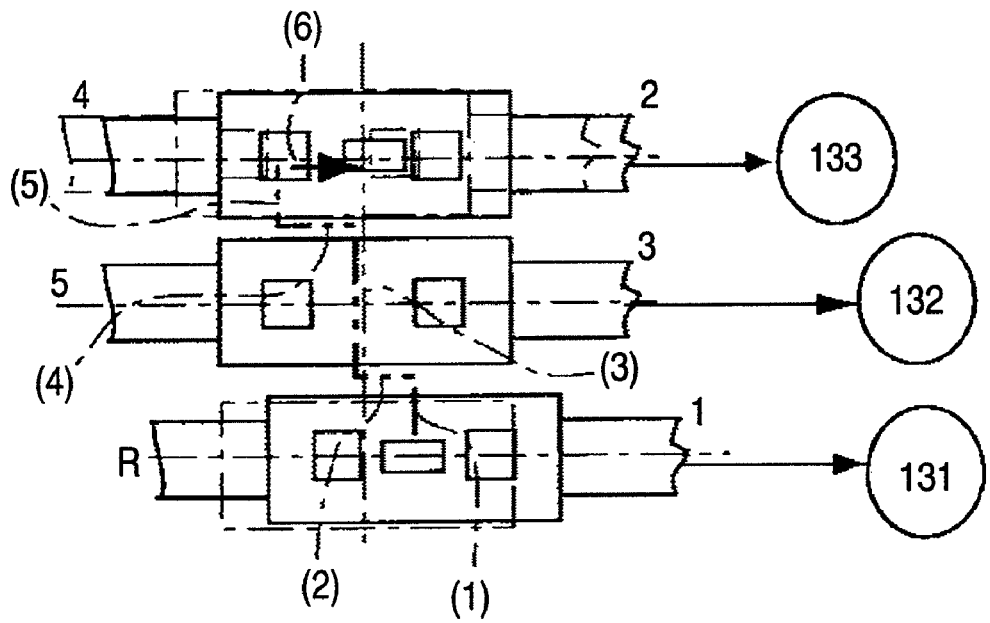

In this case, as is indicated by solid lines in FIG. 5A, the gear change to the currently engaged first gear has already been completed, and the actuator displaces both the arm portions 51 in the first and second positions E1, E2 from the shift line and rotates them to withdrawal positions (refer to a withdrawal rotation area e1 in FIG. 5B). Then, the actuator selects and rotates the arm portion 51 in the first position E1 to be positioned on a sixth to second gear shift line and then causes the same arm portion 51 to swing so as to shift the pillar-shaped projecting portion 401 of the shift lug 40 lying in a neutral position N into the second gear.

Thereafter, when the synchronization in rotational speed of the second gear is completed, the first clutch 2 is disengaged, while the second clutch 3 is engaged, whereby a smooth gear change is made without any interruption of power flow. Furthermore, in this embodiment, since the dual clutch is adopted, in anticipation of the next gear change operation or a so-called upshift operation to the third gear, the actuator displaces both the arm portions 51 in the first and second positions E1, E2 from the shift line and rotates them to the withdrawal positions. Thereafter, the actuator selects and rotates the arm portion 51 in the first position E1 and thereafter returns the arm portion 51 on to a first to third gear shift line, where the arm portion 51 rotates not only to return the pillar-shaped projecting portion 401 of the first to third gear shift rail 30 which the arm portion 51 is now facing oppositely to its neutral position N from the first gear position but also to continue to shift the same shift rail 30 to the third gear for preparation for an upshift operation to the third gear.

In addition, when the first gear needs to be returned to the neutral state, both the arm portions 51 in the first and second positions E1, E2 are displaced from the shift line and are rotated to the withdrawal positions, and thereafter, the arm portion 51 in the first position E1 is selected and rotated so as to be returned on to the first to third gear shift line. Then, in that position, the arm portion 51 is rotated to implement a return operation (refer to FIG. 5B) in which the pillar-shaped projecting portion 401 of the first to third gear shift rail 30 which the arm portion 51 is now facing oppositely is returned to its neutral position from the first gear position.

In this way, in the shift lug 40 on the first to third gear shift line, the arm portion 51 in the first position E1 selects and moves to the first to third gear shift line, where the arm portion 51 comes into abutment with one f0 of both side surfaces of the pillar-shaped projecting portion 401 of the shift lug so as to apply a pressure F thereto, whereby the gear shift operation to the first gear is made by the swinging operation of the arm portion 51. Thereafter, the arm portion 51 in the first position E1 is selected to move to the sixth to second gear shift line, whereby the an upshift operation to the second gear is completed. Thereafter, the arm portion 51 in the first position E1 is selected to return to the first to third gear shift line again, where the arm portion 51 applies the pressure F to the other f0 of the side surfaces of the shift lug 40 to perform a gear shift withdrawal operation. As this occurs, as is shown in FIG. 5B, the "gear shift making operation (gear engaging)" and the "gear shift withdrawal operation (gear disengaging)" can be implemented by the pillar-shaped projecting portion 401 of the single shift lug 40, and the projecting amount of the shift lug 40 can be reduced to as low a level as possible. In addition, the degree of freedom in layout is increased, and a cost reduction effect can be provided.

Furthermore, the arm portion 51 in the first position E1 is selected to move from the neutral position of the currently engaged gear to a neutral position on the target gear side and thereafter makes a gear shift to the target gear. In a gear shift withdrawal operation that will occur thereafter, the actuator displaces both the arm portions 51 in the first and second positions E1, E2 from the shift line and rotates them to the withdrawal positions, whereafter the arm portion 51 in the first position E1 is selected to rotate to complete a gear shift withdrawal operation in which the previous gear (the first gear) is returned to its neutral position. Thus, the number of steps involved in the gear shift withdrawal operation can be reduced so as to implement the gear shift withdrawal operation in a smooth fashion, thereby making it possible to shorten the gear change time.

Moreover, in the selected movement to the sixth to second gearshift line, there will be provided the following advantage when the arm portion 51 in the first position E1 swings to shift the pillar-shaped projecting portion 401 of the shift lug 40 into the second gear (refer to FIG. 5A) or when the arm portion 51 performs an upshift operation to the third gear on the first to third gear shift line following the gear shift withdrawal.

Namely, as is shown in FIG. 5B, an angle $\alpha 2$ of a swing center axis of the arm portion 51 which comes into abutment with the pillar-shaped projecting portion 401 whose center axis N intersects the operation axis Lc (denoted by reference character c in FIG. 5B) of the shaft portion 50 is relatively small. Because of this, the pressure Ps which is applied by the arm portion 51 to the faces f0 of the pillar-shaped projecting portion 401 which face oppositely in the shifting direction sf can be held relatively large.

Namely, as is shown in FIG. 5B, assuming that the force applied to the oppositely facing surfaces f0 of the projecting portion 401 by the arm portion 51 is a tangential force F, a distance from a contact point a between the arm portion 51 and the pillar-shaped projecting portion 401 to an axial center C of the control shaft 100 is a distance L2, an inclination angle of a line which connects the contact point a with the axial center C in the shifting direction sf is an angle $\alpha$, a component force P1 (referred to as Ps in FIGS. 5A and 5B) of the tangential force F in the shifting direction is obtained by the expression (1) mentioned above. It is clear from the expression (1) that with as the angle $\alpha$ becomes smaller, the component force P1 (referred to as Ps in FIGS. 5A and 5B) approaches the tangential force, that is, the component force P1 increases, and this ensures that the gear shift making operation is performed properly, thereby making it possible to reduce the gear change time.

In addition, when the "gear shift withdrawal operation (gear disengaging)" is performed as is indicated by a chain double-dashed line in FIG. 5B, although the pressure by the other of the pair of arm portions 51 is dispersed compared with the gear shift making force, the force as large in magnitude as one required when the "gear shift making operation (gear engaging)" is performed is not necessary, and a smooth gear shift withdrawal operation can be maintained.

Furthermore, as is shown in FIG. 1, when the invention is applied as the gear change control system of the automatic transmission 1 in which the rotational force is selectively transmitted through the gears to the oppositely facing countershafts 6, 7 of the automatic transmission via the first and second main shafts 4, 5 of the dual clutch, since the gear change process can be shortened to increase the gear change speed, the gear change control system can increase the gear change controllability in cooperation with the dual clutch.

Next, referring to FIGS. 6A and 6B, a case will be described in which an upshift operation is made from the currently engaged gear, which is the fifth gear in this case, to the sixth gear.

In this case, the currently engaged gear is the fifth gear (refer to solid lines in FIG. 6A). The actuator displaces both the arm portions 51 in the first and second positions E1, E2 and rotates them to the withdrawal positions. Thereafter, the actuator selects and rotates the arm portion 51 in the first position E1 and moves the arm portion 51 on to the sixth to second gear line, where the arm portion 51 shifts the shift lug 40 on the sixth gear (the target gear) side into the sixth gear. When starting a gear shift withdrawal operation from the currently engaged fifth gear, the actuator displaces both the arm portions 51 in the first and second positions E1, E2 and rotates them to the withdrawal positions (refer to a withdrawal position e1 in FIG. 6B). Thereafter, the actuator rotates the arm portion 51 in the second position E2 on the fifth gear shift line on the previous fifth gear (the previously engage gear) side and returns the same arm portion 51 in the shifting direction so as to return the previous fifth gear (the previously engaged gear) to its neutral position, whereby the gear shift withdrawal operation is completed. In addition, when the synchronization of rotational speed of the sixth gear with the engine speed is completed, the first clutch 2 is released, while the second clutch 3 is applied, whereby the gear change without interruption of power flow is made.

In this case, in the gear shift withdrawal operation, both the arm portions 51 in the first and second positions E1, E2 are displaced from the shift line, and thereafter, the arm portion 51 in the second position E2 is caused to swing in the gear shift withdrawing direction so as to return to the neutral state. Thus, the aforesaid operations only have to be carried out to complete the gear shift withdrawal operation, and when compared with the conventional gear change control system, the gear shift withdrawal operation can be made in a smoother fashion, and the gear change time can also be shortened.

Moreover, as is shown in FIG. 6B, since the angle α2 of the swing center axis (indicated by an alternate long and short dash line) of the arm portion 51 which comes into abutment with the center axis of the pillar-shaped projecting portion 401 at a point c (the position of the selection axis) is relatively small, the component force (referred to as Ps in FIGS. 6A and 6B) in the shifting direction of the tangential force F which is applied to the side surfaces f0 of the projecting portion 401 which face oppositely in the shifting direction by the arm portion 51 can be held relatively large, whereby the shifting operation is ensured and the gear change time can be reduced.

The automatic transmission 1 described heretofore is the dual-clutch automatic transmission which includes the two clutches 2, 3 and the two main shafts 4, 5 and is configured in such a manner that the rotational force is selectively changed in speed to be transmitted to the oppositely facing countershafts 6, 7 of the automatic transmission through the driven gears 11 to 17 via the first and second main shafts 4, 5. Since the invention is applied as the gear change control system of the automatic transmission 1 that has been configured as has been described above, in particular, the function to shorten the gear change process so as to increase the gear change speed can cooperate with the function of the dual clutch so as to increase the gear change controllability.

In addition, in addition to the dual-clutch automatic transmission, the invention can also be applied to a normal single-clutch automatic transmission, in which case the same function and advantage as those provided in this embodiment can also be provided.

In contrast to the related art in which the arm member is moved to enter the grooves on the shift lugs which include the pairs of left and right claw portions for shifting operation, according to an aspect of the invention, the degree of freedom is increased in assembling the arm member which can rotate about the selection axis to reach the withdrawal position to thereby be selected to move in the selection axis direction and the shift lugs on which the pillar-shaped portions are formed and the shape of the shift lug is simplified, resulting in an advantage that the production costs are reduced. In addition, by selectively bring the arm member which rotates about the selection axis into abutment with the pillar-shaped portion of the shift lug from both the sides thereof so as to exert the pressure thereon, the "gear shift making operation (gear engagement)" and "gear shift withdrawal operation (gear disengagement)" can be implemented by the single pillar-shaped shift lug, whereby the number of projecting portions formed on the shift lug is reduced as many as possible so as to simplify the shape of the shift lug.

According to an aspect of the invention, since the sides of the pillar-shaped portion of the shift lug with which the arm member is brought into abutment are made to have a planar shape, the pressure exerted from the arm member can be received by the surfaces in an ensured fashion, thereby making it possible to ensure the implementation of the "gear shift making operation (gear engagement)" and "gear shift withdrawal operation (gear disengagement)."

According to an aspect of the invention, by the rotational center axis of the finger (the arm portion) being disposed on the center axis in the projecting direction of the pillar-shaped portion of the shift lug member, when performing the shift making operation (gear engagement), the angle at which the finger is brought into abutment with the pillar-shaped portion of the shift lug member becomes extremely small, that is, the abutment angle between the finger and the side surface of the pillar-shaped portion of the shift lug member becomes close to 90 degrees, whereby the pressure exerted by the finger is transmitted in the form of a gear shift making force with good efficiency. On the other hand, when performing the gear shift withdrawal operation (gear disengagement), although the pressure of the finger is dispersed, this poses no problem since a force which is as large as the force required when performing the gear shift making operation (gear engagement) is not necessary when performing the gear shift withdrawal operation (gear disengagement).

According to an aspect of the invention, the invention can be applied to a gear change control system for an automatic transmission in which a rotational force is selectively changed in speed to be transmitted through gears to countershafts of the transmission which are made to face oppositely each other via the first and second main shafts of the dual clutch, and as this occurs, in particular, since the gear change process can be shortened to increase the gear change speed, the gear change control system can increase the gear change controllability in cooperation with the dual clutch.

According to an aspect of the invention, by the arm member in the first position being made to shift the respective gears of the first group and the arm member in the second position being made to shift the respective gears of the second group, the respective arm portions can be made not to move over the predetermined interval between the first and second groups, whereby the traveling amount in the selecting direction of each arm portion can be made relatively small, thereby making it possible to improve the controllability of the system selected for operation.

The invention thus described, it will be obvious that the same say be varied in many ways. Such variations are not to be regarded as a departure from the sprit and scope of the invention, and all such modifications as would be obvious to one skilled in the art are intended to be included within the scope of the following claims.

What is claimed is:

1. A gear change control system of an automatic transmission, comprising:
   a shift member, including a shaft portion disposed in such a manner that a selection axis thereof is oriented in a selecting direction, and including an arm portion formed on the shaft portion in such a manner as to project radially therefrom;
   shift fork portions, operable to make gear shifts of gears within a change-speed gear section;
   a plurality of shift rail members, connected to the shift fork portions, and arranged in such a manner that shift axes thereof are oriented in a shifting direction; and
   shift lug members, projecting from the shift rail members, and being capable of facing the arm portion, wherein
   the arm portion of the shift member moves for selection and gear shifting and presses against the selected shift lug member, so that a gear shift to a target gear is attained by the shift fork portion which is linked with the shift lug member so pressed against,
   wherein, each of the shift lug members include only a single pillar-shaped portion, and
   the arm portion is provided as a member rotating about the selection axis in a position where the arm portion faces a selected shift lug member, and
   the arm portion moves for selection in a direction of the selection axis to select the single pillar-shaped portion of the selected the shift lug member and then swings about the selection axis
      to apply a pressure in the shifting direction against a first side surface of the single pillar-shaped portion of the selected shift lug member to cause the shift fork portion of the shift rail member linked with the selected shift lug member to perform a shift making operation, and
      to apply a pressure in the shifting direction against a second side surface of the single pillar-shaped portion of the selected shift lug member to cause the shift fork portion of the shift rail member linked with the selected shift lug member to perform a shift withdrawing operation, and
   wherein,
   the single pillar-shaped portion of the shift lug member projects from the shift rail member substantially perpendicularly relative to the shifting direction, and
   the single pillar-shaped portion of the shift lug member is provided in such a manner that a center axis in the projecting direction of the single pillar-shaped portion of the shift lug member intersects the selection axis which is a rotational axis of the arm portion when the shift fork portion of the shift rail member is in a neutral state.

2. The gear change control system of the automatic transmission as set forth in claim 1, wherein
   the first side surface extends in a direction parallel to the second side surface, and the first side surface faces away from the second side surface.

3. The gear change control system of the automatic transmission as set forth in claim 1, wherein
   the automatic transmission comprises a plurality of gears divided into first and second groups, and first and second main shafts associated with the first and second groups, respectively, the first and second main shafts being coupled to an engine driving force transmission shaft via a dual clutch.

4. The gear change control system of the automatic transmission as set forth in claim 3, wherein
   the arm portion is formed in a first position and a second position on the shaft portion, the first position and the second position being spaced apart from each other with a predetermined interval therebetween in the selecting direction.

5. The gear change control system of the automatic transmission as set forth in claim 2, wherein
   the single pillar-shaped portion of the shift lug member projects from the shift rail member substantially perpendicularly relative to the shifting direction, and
   the single pillar-shaped portion of the shift lug member is provided in such a manner that a center axis in the projecting direction of the single pillar-shaped portion of the shift lug member intersects the selection axis which is a rotational axis of the arm portion when the shift fork portion of the shift rail member is in a neutral state.

6. The gear change control system of the automatic transmission as set forth in claim 3, wherein
   the shift member includes a first arm portion and a second arm portion provided spaced apart from the first arm portion, and
   the first arm portion makes contact with the single pillar-shaped portion of the shift lug members associated with the first group, and the second arm portion makes contact with the single pillar-shaped portion of the shift lug members associated with the second group.

* * * * *